United States Patent Office 3,455,824
Patented July 15, 1969

3,455,824
ORGANIC SUSPENDING MEDIUM AND
COMPOSITION
Franklin I. L. Lawrence, Bradford, and Michael J.
Pohorilla, Berwyn, Pa., assignors to Kendall Refining Company, a corporation of Pennsylvania
No Drawing. Continuation-in-part of application Ser. No.
815,810, May 26, 1959, which is a continuation-in-part
of application Ser. No. 559,759, Jan. 18, 1965. This
application Mar. 25, 1966, Ser. No. 537,326
Int. Cl. C10m 1/10, 1/14, 3/00
U.S. Cl. 252—25       10 Claims

ABSTRACT OF THE DISCLOSURE

A composition of matter and a method of incorporating in oleaginous compositions a normally oil-insoluble material stably dispersed in a sulfur condensed petroleum hydrocarbon resin produced by contacting a hydrocarbon starting material having an ebullioscopic molecular weight in excess of about 500 at temperature at least 400° F. with sulfur, thereafter blending the oil-compatible alkaline earth organic salt with the sulfur condensed hydrocarbon, contacting the mixture with an acidic gas and removing the acidic organic constituent.

This application is a continuation in part of application Ser. No. 815,810 filed May 26, 1959 which was in turn a continuation in part of application Ser. No. 559,759 filed Jan. 18, 1956 both now abandoned.

This invention relates broadly to the incorporation of oil-insoluble material into oleaginous compositions. More particularly, this invention relates to oil-compatible, sulfur-condensed hydrocarbons containing suspended, normally oil-insoluble materials and to oleaginous compositions having said sulfur-condensed hydrocarbons with suspended oil-insoluble materials blended therewith. Additionally, this invention encompasses methods whereby normally oil-insoluble materials may be uniformly dispersed throughout an oil-compatible, sulfur-condensed hydrocarbon suspending medium.

In a vast number of industrial applications, it has been found exceedingly desirable to effect a stable blending of normally oil-insoluble materials in oleaginous compositions. Thus, it is desirable to effect a stable dispersion of a wide variety of oragnic and inorganic oil-insoluble additives in lubricants to enhance the properties of the lubricant. Alakline earth carbonates, for example, possess excellent detergent properties and successfully counteract the formations of acids in lubricating compositions. Additionally, such oil-insoluble compounds as boric acid, boric acid esters, ascorbic acid, and the like, are known to impart excellent antioxidant characteristics to lubricants. The limited solubility of these materials in oil, however, has greatly restricted their application as lubricant additives.

In other areas, it is also advantageous to effect a stable blending of oil-insoluble materials with oleaginous compositions. For example, it is desirable to blend oil-insoluble copper anti-fouling compounds with oleaginous marine coating compositions and oil-insoluble anti-fungus and anti-termite materials with other oleaginous coatings. Since it often is necessary to reduce a coating composition to the fluid state with heat or solvents prior to application, it is essential that the oil-insoluble materials remain uniformly distributed throughout the coating composition while the composition is in such fluid or semifluid state.

It is an object of the invention to provide oleaginous compositions having normally oil-insoluble materials stably suspended therein.

It is another object of this invention to provide noncorrosive oleaginous compositions having normally oil-insoluble materials stably suspended therein.

It is an additional object of the invention to provide a lubricant which demonstrates high detergency characteristics.

It is a further object of the invention to provide a lubricant having high oxidation stability.

It is a still further object of the invention to provide oleaginous coating compositions having normally oil-insoluble materials stably suspended therein.

It is yet another object of the invention to provide a process whereby oil-insoluble compounds may be incorporated into sulfur-condensed hydrocarbons.

In accordance with this invention, there is provided a composition of matter ideally suited for incorporation into oleaginous compositions which comprises a normally oil-insoluble material stably dispersed in an oil-compatible, sulfur-condensed hydrocarbon produced by contacting a hydrocarbon starting material having an ebullioscopic molecular weight in excess of about 500, while at a temperature of at least 400° F. (preferably about 425° F. to about 575° F.), with at least about 5% by weight of elemental sulfur for a period of time requisite to produce a final condensation product effective, in a concentration of about 10% by weight, to increase the viscosity index of a 60 at 100 SUS standard base oil derived from a paraffinic crude source at least ten viscosity index units more than does a like amount of the hydrocarbon starting material from which said condensation product is produced.

The present invention is bottomed on the discovery that the herein described noncorrosive, substantially oil-compatible, sulfur-condensed hydrocarbons are excellently suited as a suspending medium or vehicle for oil-insoluble materials to effect a stable suspension of the oil-insoluble materials in oleaginous compositions. While the sulfur-condensed hydrocarbons which constitute the vehicle of the present invention are somewhat heterogeneous in character and are not capable of precise identification, it appears that the sulfurization produces a material which, at least in substantial part, partakes of a microgel structure. It is this microgel structure which seemingly is responsible for the remarkable effectiveness of these compositions as suspending mediums for oil-insoluble materials.

The term "microgel" as referred to herein denotes hydrocarbons condensed to superpolymeric size, each superpolymeric molecule being essentially a small particle of condensate approximating colloidal dimensions. In accordance with this invention, the oil-insoluble materials are colloidally dispersed in the sulfur-condensed microgel suspending medium and the sulfur-condensed suspending medium containing colloidally dispersed oil-insoluble materials then is incorporated into an oleaginous composition. Alternatively, the sulfur-condensed suspending medium may be incorporated into an oleaginous composition and the oil-insoluble material thereafter dispersed in the suspending medium. While the sulfur-condensed microgels of the present invention are oil-compatible, they do not form a true molecular solution with oils, but rather are uniformly suspended throughout the oil as small particles, each particle having approximately colloidal dimensions. Thus the microgels of the present invention, themselves containing colloidally dispersed oil-insoluble materials, effect a uniform distribution of oil-insoluble materials, throughout oleaginous base compositions.

The sulfur-condensed microgels of this invention may be employed to incorporate a wide variety of normally oil-insoluble organic and inorganic materials in oleaginous compositions. The sulfur-condensed microgels may be employed to incorporate elemental compounds such as sulfur; metal inorganic salts such as alkaline earth carbonates, alkaline earth chlorides, alkaline earth sulfides; molybdenum sulfides, and the like; solid inorganic acids such as boric acid, and the like, metal organo compounds such as cupric acetate, antimony acetate, boric acid esters, barium carbonate, n-butyl dithiophosphoric acid complexes, and the like; and normally solid organic compounds such as pentachlorophenol, ascorbic acid, $\beta$-naphthylphenylamine, di-$\beta$-naphthylamine, phenothiazine, and the like.

The compositions of the present invention may be incorporated into all varieties of oleaginous compositions. They may be employed in oils and greases derived from Pennsylvania crude oil, mid-continent crude oil, asphalt base oils, and all other types of mineral oils as well as synthetic oils including the synthetic ester type oils such as di-2-hexylethyl sebacate and the di-2-ethylhexyl adipate, and phosphonate oils, such as dibutyl diphosphonate oils, tetrabutyl tetramethylene diphosphonate, and bis-(2-ethylhexyl) 2-ethylhexyl phosphonate. Additionally, the compositions of the present invention may be incorporated into tar and tarlike coating compositions, as well as compositions generally having an oleaginous base.

The sulfur-condensed resin containing oil-insoluble material may be incorporated into oleaginous-base compositions at ambient temperatures if the oleaginous composition is sufficiently fluid to effect a dispersion of the suspending mediums. In the event that the oleaginous-base composition is extremely viscous or solid at ambient temperatures, the compositions of the present invention may be blended with the oleaginous base at elevated temperatures or by the utilization of diluent oils.

The amount of oil-insoluble materials to be incorporated into an oleaginous composition will vary depending upon the particular application. In the case of barium carbonate or other antacid compounds in lubricating compositions, it may be desirable to incorporate as much as possible. In the case of fungicides, antioxidants and the like, small quantities, such as .05% or less may accomplish the desired result.

In the interests of orderly presentation, the preparation of the sulfur-condensed microgel first will be described and methods for incorporating the oil-insoluble materials into the suspending medium subsequently will be discussed.

The sulfur-condensed hydrocarbons of this invention are usually characterized by a ring and ball softening point, as measured by A.S.T.M. Method E 28–42T, of more than about 80° F. Some microgels comprehended by the invention have a ring and ball softening point or viscosity too low to be effectively measured in accordance with the aforementioned procedure. Such materials are characterized by a viscosity of at least about 400 SUS at 210° F., preferably at least about 1000 to 5000 SUS at 210° F. and, in any event, a viscosity of at least about 200 SUS at 210° F. greater than the hydrocarbon starting materials from which microgels are produced.

The degree of sulfur condensation contemplated by the present invention most appropriately may be measured by determining the effectiveness of the sulfur-condensed product as a viscosity-index improving agent. Thus, the sulfur-condensed microgel contemplated by the present invention must be effective, in a concentration of about 10% by weight, to increase the viscosity index of a 60 at 100 SUS standard base oil derived from a paraffinic crude source at least ten viscosity index units more than does a like amount of the hydrocarbon starting material from which said condensation product is produced.

The hydrocarbon starting materials which are employed in the production of the microgel suspending medium of the invention must be characterized by an average ebullioscopic molecular weight of at least about 500, preferably at least about 1000. An optimum average ebullioscopic molecular weight range is from about 1200 to 1700. Similarly, the hydrocarbon starting materials employed in preparation of the microgel suspending medium of the invention will be characterized by an SUS viscosity at 210° F. of between about 60 and 15,000. The preferred materials with a molecular weight of at least about 1000 are further characterized by a viscosity in excess of about 900 SUS at 210° F.

The most appropriate starting materials for the production of the microgels of the invention are suitable crude oil fractions. Appropriate fractions derived from crude oils of any source, including Pennsylvania crude oils, mid-continent crude oils, West Coast crude oils, Canadian crude oils, and the like, can be employed. All types of crude oils, including paraffin base crude oils, asphalt base crude oils, and naphthenic crude oils provide suitable sources from which petroleum fractions useful in the production of the microgels of the invention can be derived.

While the invention contemplates the production of microgels from pure or substantially pure individual hydrocarbons, such materials do not constitute optimum starting materials. It will be appreciated, however, that such pure hydrocarbons of appropriate molecular weight can be suitably employed.

With respect particularly to fractions derived from Pennsylvania crude oils, it is preferred that the hydrocarbon starting materials from which the microgels of this invention are produced be characterized by a bromine number not in excess of 10. Many of the pure, high-molecular-weight hydrocarbons suitable as starting materials are characterized by a bromine number of 0.

It is additionally preferred that hydrocarbons which are utilized as starting materials for the production of the microgels of the invention contain more than about 2 naphthenic rings per molecule. The rings individually can be integrated with the paraffinic chain portion of the hydrocarbon molecules or condensed with aromatic rings and/or with other naphthenic ring systems. It is also preferred that the hydrocarbon starting materials contain an average of not more than about 50% aromatic carbon atoms. Hydrocarbons which contain an appreciable quantity of highly condensed ring systems, such as those hydrocarbons which are found in the phenol or furfural extracts of lubricating oils, are operable and are most appropriately employed as starting materials for the production of microgels designed for use in synthetic lubricating oil compositions such as the diester oils.

Additionally, it is preferred that the petroleum fractions from which the microgels of the invention are produced contain not more than about 10% of wax-type materials. (The wax content herein referred to is determinable by a procedure similar to that described under A.S.T.M. designation D–721–51T with the exception that methyl isobutyl ketone is employed to precipitate the wax, the sample size is reduced to 0.5 gram, and the determination is conducted at 0° F.) While the starting materials which contain substantially more than 10% by weight of wax as determined by this test (e.g., petrolatum which may reflect a wax content on the order of 40% by weight) can be employed in the production of the microgels of the invention, such materials are not preferred. Such materials best can be used by being blended with more desirable starting materials, such as the preferred petroleum fractions above described, in proportions up to about 25% by weight of the total blend.

Normal or vacuum distillation residual stocks and analogous fractions of paraffin base crude oils, such as Pennsylvania crude oils, are highly appropriate starting materials for the production of the microgels employed in this invention. Hydrocarbons precipitated by conventional propane precipitation processes from such residual stocks are particularly suitable.

Further refinement of such propane-precipitated, high-molecular-weight hydrocarbons, which include both light and heavy resin fractions, by extraction with furfural or phenol in conventional manner, yields a raffinate from which microgels of maximum effectiveness are produced. Conventional solvent extraction processes are utilized to obtain such raffinates. Such processes are well known to the prior art and are described in detail, inter alia, in Industrial and Engineering Chemistry, 40, pages 220–227 (1948), and at pages 335–336 of "Chemical Refining of Petroleum" by V. A. Kalichevsky and B. A. Stagner, Reinhold Publishing Co., 1942. Generally, the degree of extraction should be such as to yield about a 70% to 85% raffinate. More drastic extraction, for example, to yield 50% to 60% raffinates, may be practiced to obtain still more desirable starting materials for the production of the microgels of the invention.

The most preferred starting material for the production of the dispersing mediums of this invention embraces a solvent-extracted Pennsylvania crude oil fraction which has a molecular weight of from about 1200 to about 1700 and a bromine number of not more than about 4, which is substantially wax- and asphalt-free, which contains not more than about 5% by weight of hydrocarbon molecules containing more than 50% aromatic carbon atoms, and which consists primarily of hydrocarbon molecules containing an average of from about 2 to about 7 naphthenic rings.

The microgels of the present invention are produced by contacting an appropriate hydrocarbon starting material, while at a temperature of at least about 400° F., preferably from about 425° F. to about 575° F., with at least 5% by weight of elemental sulfur for a time requisite to produce the final condensation product having a viscosity of at least 200 SUS at 210° F. greater than the original starting material.

The rate of supply of elemental sulfur to the reaction mixture is not critical to the production of the condensation products. Two suitable methods of sulfur addition are hereinafter described.

A first method is to add most of the sulfur (about 20 to 25 parts by weight of sulfur per 100 parts of hydrocarbon) at room temperature or some temperature below that at which sulfur will readily react with the hydrocarbon, i.e., about 350° F. The temperature then slowly is raised at a rate so that the foam caused by the hydrogen sufide generated in the reaction will not overflow the reaction vessel. It generally takes about two to four hours to reach 500° F. A small amount of sulfur then is added with continued heating to bring the condensate up to the desired ring and ball softening point.

According to a second method, the hydrocarbon initially is heated to the reaction temperature, i.e., about 500° F., and then sulfur is added slowly enough so the foam caused by the generated hydrogen sulfide does not overflow the reaction vessel. This rate of sulfur addition is generally about one part by weight of sulfur per 100 parts by weight of hydrocarbon about every 0.25 hour.

About 16 hours or more may be used to effect the condensation but this extreme length of time is not preferred. It is preferable to limit the total time at the elevated temperature to less than about 8 hours. The time required may be reduced down to a few minutes provided the equipment can handle the large amount of foam produced.

Reactive materials, such as chlorine, hydrogen chloride, phosphorus pentoxide, and like materials, which serve as activators, appropriately may be introduced into the reaction mixture in conjunction with the elemental sulfur. Conventional catalysts known to the art may be employed, if desired.

For some applications, it may be desired further to enhance the resistance to oxidation or otherwise improve the condensation products which are employed in the invention. Such modifications effected, inter alia, through chemical modification of the hydrocarbonaceous condensation products, hereinafter described, produce non-equivalent materials. More specifically, the oxidation resistance of such condensation products is increased by further chemical treatment to neutralize reactive groups and/or simultaneously build antioxidant properties into the molecular structure.

Polyalkylene polyamines derived from ethylene diamine, such as diethylene triamine, triethylene tetramine, tetraethylene pentamine; aromatic amines such as diphenylamine and o-phenylenediamine; ammonia, and the like, or mixtures thereof, are also suitable modifying agents for the otherwise unmodified hydrocarbonaceous condensation products of the invention.

Additionally, the various isocyanates which correspond to the following formula:

(I) $\quad\quad\quad R(N{=}C{=}O)_n$ in which R is an alkyl group containing from 1 to 10 carbon atoms, and $n$ is any integer from 1 to 3 inclusive, can be employed to modify the sulfur condensation products of the invention. Typical alkyl groups which are represented by R include methyl, ethyl, propyl, isopropyl, butyl, isobutyl, hexyl, octyl, decyl, and the like. R may also be aryl, including tolyl, phenyl, diphenyl methane, alpha-naphthyl, and the like, in the foregoing isocyanate formulae.

As illustrated in the examples, the aforementioned inorganic and organic reagents are utilized, alone or in combination, by heating a mixture of the condensation product and the selected reagent or reagents at an appropriate temperature for a short period of time. In general, at least about 0.25% by weight, preferably about 0.25% to about 5.0% by weight of the organic or inorganic reagents, or mixtures thereof, are employed, based on the weight of the condensation product. Such quantities generally afford an excess of the reagent, which is not objectionable. The temperature and time of the reaction are not critical. A temperature of from about 175° F. to about 500° F. and a reaction time of at least about 20 minutes, preferably from about 20 to 120 minutes, can be observed with satisfactory results. The reaction may be conducted under an inert atmosphere, if desired. In the case of certain of the organic reagents, temperatures must be controlled to prevent decomposition. A preferred procedure is to convert the hydrocarbon fraction employed as a starting material to a sulfur condensation product having a ring and ball softening point somewhat below for example, 10 to 20° below the softening point desired in the final product, followed by reaction with the above-described reagents to an extent requisite to raise the ring and ball softening point to the ultimately desired value.

Additionally, the hydrocarbon starting material initially may be condensed with sulfur to produce an intermediate product which is further reacted with phosphorus pentasulfide, the phosphorus pentasulfide reaction product being finished by condensation with additional sulfur to produce a final product of the desired ring and ball softening point. Alternatively, the hydrocarbon starting material may be first reacted with phosphorus pentasulfide to produce an intermediate product and thereafter condensed with sulfur to produce a final product of the desired ring and ball softening point. More particularly, there may be employed in such processes up to about 5% by weight, based on the hydrocarbon, of phosphorus pentasulfide. The sulfur is employed in an amount requisite, for example, 10% to 30% by weight, to produce the desired physical characteristics, such as ring and ball softening point, in the end product. Other phosphorus sulfides, such as phosphorus sesquisulfide and the like, may be employed in a similar fashion.

Inasmuch as many condensation products contemplated by the invention are readily workable only at relatively high temperatures, i.e., 350° F. to 450° F., an alternative method for modifying such products is advantageously employed when reagents are utilized which may be unstable at such high temperatures. Such alternative procedure embraces first blending the condensation product which is to be modified, with an appropriate base stock in suitable proportions, followed by the addition of the desired quantity of reagent. More specifically, the condensation products may be mixed in proportions from about 20% to 50% by weight with, for example, the ultimate base stock in which they are to be utilized. To the mixture so obtained, there is then added from about 1 to about 5% by weight of the desired reagents, based upon the condensation product, preferably in small proportions. This addition may be effected under an inert atmosphere, if desired. The desired reaction is then effected at a temperature of from about 175° F. to 275° F. The ultimate product so obtained is then admixed in appropriate concentration with additional quantities of the base stock employed. This procedure is particularly applicable in the modification of the condensation product through utilization of such reagents as the isocyanates and amines, as above defined.

In some applications, it is desirable to treat the sulfur-condensed product employed in this invention to reduce further or minimize the corrosivity thereof. It is generally considered that, to the extent that such condensation products are corrosive, such characteristic is attributable to the presence of residual sulfur compounds, such as hydrogen sulfide, reactive organic sulfides and polysulfides, mercaptans, and the like. Such corrosivity can be eliminated in various ways, two of which are described hereinafter.

A first method is generally chemical in its approach and entails the treatment of the material with an oxidizing agent, such as air or elemental oxygen; hydrogen peroxide; the various other inorganic peroxides; inorganic chlorates and perchlorates, such as sodium chlorate, potassium chlorate, sodium perchlorate, potassium perchlorate; chlorine dioxide; nitrogen dioxide; organic peroxides and hydroperoxides such as benzoyl peroxide, di-tert-butyl peroxide, cumene hydroperoxide, tertiary butyl hydroperoxide, and the like. This invention contemplates the use broadly of oxidizing agents to reduce or minimize the corrosivity of the sulfur condensation product.

A second method for minimizing corrosivity of the sulfur condensation product is essentially physical in character and entails contacting the condensation product with an inert gas at an elevated temperature normally as a sweep gas either during or immediately after the condensation reaction. A representative inert gas useful for this purpose is nitrogen.

The condensation products produced in the above-described manner not only constitute excellent suspending mediums for oil-insoluble materials in oleaginous compositions, but additionally exhibit marked viscosity index improving characteristics. Thus when the compositions of the present invention are incorporated into lubricants, power transmission fluids, shock absorber fluids and the like, the viscosity index and detergency or the viscosity index and oxidation stability of the base composition simultaneously may be enhanced. Moreover, oil-insoluble antioxidants may be incorporated into the sulfur-condensed hydrocarbon to enhance its own resistance to oxidation and thereby permit its utilization as a viscosity index improving agent in very high temperature service.

The method which most appropriately may be employed to incorporate the oil-insoluble material into the sulfur-condensed microgel will vary depending upon the characteristics of the oil-insoluble material to be dispersed.

In the event that it is desired to disperse an inorganic alkaline earth salt through the sulfur-condensed hydrocarbon, such dispersion most appropriately may be accomplished by blending an oil-compatible alkaline earth metal organic salt with the sulfur-condensed hydrocarbon and converting the alkaline earth metal organic salt to an alkaline earth inorganic salt in situ by contacting the mixture with an acidic gas. The acidic gas liberates the organic constituent of the alkaline earth organic salt and results in a dispersion of alkaline earth inorganic salt throughout the sulfur-condensed hydrocarbon. More particularly described, this process embodiment of the invention comprises blending an oil-compatible alkaline earth organic salt with a sulfur-condensed hydrocarbon and contacting the mixture while at a temperature of from about 250° to about 500° F., and preferably from about 350° to about 450° F., with an acidic gas. The acidic gas is used in sufficient quantity to allow the law of mass action to take place. The equilibrium will eventually be displaced by removing the volatile constituent of the alkaline earth metal organic salt.

Since barium carbonate exhibits excellent detergency characteristics when blended with lubricating compositions, a particularly preferred embodiment of the process comprises blending a barium phenate, preferably octyl or nonyl phenate, with a sulfur-condensed hydrocarbon and contacting the mixture while at a temperature of from about 250° to about 500° F., and preferably from about 350° to about 450° F., with a mixture of carbon dioxide and steam.

The oil-compatible alkaline earth metal organic salts operable in the invention include the alkaline earth metal salts of a wide variety of organic compounds. The organic compounds must be capable of forming metallic salts and preferably have ionization constants (measured in water at 25° C.) greater than about $1 \times 10^{-10}$ and exhibit a pH less than about seven. They include phenolic compounds, enolizable organic compounds, lower molecular weight aliphatic carboxylic acids, lower molecular weight hydroxy aliphatic carboxylic acids, and the like. While higher molecular weight organic compounds provide greater solubility, in order that the organic compound may be recovered from the alkaline earth organic metal salt-sulfur condensed hydrocarbon reaction mixture, the organic constituent from which the alkaline earth salt is formed preferably has an appreciable vapor pressure below about 600° F. to permit its removal from the reaction by the sweep gases.

Specific ionizable organic constituents of the alkaline earth organic salts which appropriately may be employed in the invention include, without limitation, phenolic compounds such as phenol, xylenol, ethyl phenol, butyl phenol, propyl phenol, p-tert-butyl phenol, pentyl phenol, heptyl phenol, octyl phenol, nonylphenol, dodecyl phenol, cresol and alkylated cresol; alkyated polyhydroxy-aromatic compounds such as octyl-catechol and nonyl catechol; alkylated hydroxyl aromatic carboxylic acids such as octyl salicylic acid and nonyl salicylic acid; aliphatic carboxylic acids such as acetic acid, butyric acid, propionic acid, caprylic acid and the like; and organic chelating agents such as isovaleryl acetonate.

The method of blending the alkaline earth metal salts with the sulfur-condensed hydrocarbons will vary depending upon the characteristics of the alkaline earth metal organic salt. If the alkaline earth metal organic salt is oil-soluble, the salt appropriately may be dissolved in a diluent oil and blended with the sulfur-condensed hydrocarbon. If the alkaline earth metal organic salt is not per se soluble in oil but is oil-soluble in its hydrated form, the salt may be combined with the appropriate amount of water of hydration nad then combined with an oil diluent. In the event that the alkaline earth metal organic salt is not totally soluble in oil, it may be slurried with an oil diluent and blended with a sulfur-condensed hydrocarbon as a slurry. The optimum method of blending employed is, therefore, dependent upon the precise characteristic of the individual alkaline earth metal organic salt.

While the lower viscosity microgels may be sufficiently fluid to permit blending, the higher viscosity microgels normally are diluted in a diluent oil prior to the blending described above.

In the event that the alkaline earth organic salts are not readily available, the salts advantageously may be formed in a diluent oil by reacting the above-identified organic compounds with an inorganic alkaline earth metal compound wherein anionic radicals are, for example, hydroxyl, sulfide, hydrosulfide, halide, hydride, basic carbonate, and the like. Preferred inorganic alkaline earth metal compounds are those having a pH greater than about seven.

The gaseous acidic materials which are operable in the process of the present invention to free the oil-insoluble material include those inorganic acids which are gaseous at the reaction temperature. These will include, for example, $HNO_3$, $HCl$, $SO_2$, $SO_3$, $CO_2$, $H_2S$, $ClO_2$, and the like. In order to provide an appropriate environment, steam desirably is injected with the gaseous materials. Steam serves to ionize the acidic materials and functions as a carrier for other acidic compounds such as $H_3BO_3$ which are not readily vaporized at the reaction temperature. In the event the alkaline earth organic salt is employed in the hydrated form, the steam may be omitted.

The rate of introduction of acidic gas into the reaction mixture is not critical to the operability of the reaction. The specific rate of acidic gas addition will depend upon equipment limitations and time considerations. It is preferred, however, that the amount of acidic gas introduced into the reaction mixture be sufficient to provide at least a slight excess of acidic gas. It has been found that higher rates of acidic gas act as a gaseous sweep and aid materially in the removal of the liberated organic constituent of the alkaline earth metal organic salt. If it is desired, an inert gas may be added to the acidic gas, thereby increasing the effectiveness of the gaseous sweep.

It is is preferred that steam be employed in sufficient amounts to provide at least one equivalent of steam per equivalent of acid. The temperature of the steam may vary from 212° F. to 500° F. or more, but the steam preferably is introduced at a temperature which approximates the temperature of the reaction mixture.

The physical equipment employed to effect the dispersion of an alkaline earth metal inorganic salt in the sulfur-condensed hydrocarbon is not critical so long as means are provided for bringing the reactants into intimate contact. The reaction vessel should contain agitating means to blend the reactants, and, additionally, should be provided with means for effecting an intimate sparging of the organic salt with the acidic gas. A vessel having a multiplicity of gas inlets is preferred.

For purposes of specific illustration, a preferred process for the dispersion of barium carbonate in a sulfur-condensed hydrocarbon is described below:

Stoichiometric amounts of barium hydroxide containing 16 moles of water per mole of hydroxide and nonyl phenol are added to a medium neutral raffinate to produce a mixture of barium nonyl phenate in the medium neutral raffinate. The solution so formed is added incrementally to a 20% concentration of sulfur-condensed hydrocarbon in a medium neutral raffinate. After each increment the mixture is stirred for twenty minutes to insure a thorough blending of the materials. The stirred mixture is then contacted with carbon dioxide and steam for twenty minutes. Following the stirring of the final increment, the reaction mixture is contacted with carbon dioxide and steam until nonyl phenol is no longer liberated from the reaction mixture. The final product is a stable dispersion of finely divided barium carbonate in sulfur-condensed resin in accordance with the invention.

The process may be employed to produce a sulfur-condensed hydrocarbon containing a barium content up to two times or more by weight of the sulfur-condensed hydrocarbon. The products so formed are extremely stable and will exhibit no precipitation of the suspended barium carbonate even after prolonged periods of storage. Such dispersions are also stable in the presence of water.

Calcium carbonate may be suspended in a sulfur-condensed hydrocarbon following the above-described process except that water of hydration produces no advantageous result in the case of calcium and therefore need not be added in the preliminary stage of the process.

Inorganic alkaline earth salt-containing additives heretofore have been prepared by adding, as essential reactants, an alkaline earth compound such as barium hydroxide, water, and a promoter such as an alkyl phenol, to an acidic organic compound, reacting at about 300° to 340° F. and then blowing with carbon dioxide to increase the alkaline earth metal content. The alkyl phenol is not recovered. The reaction product obtained is an organic acid complex, colloidal in nature, which contains greater than the normal alkaline earth metal content required to neutralize acidic groups.

The additives of the present invention are of an entirely different nature and are prepared by an entirely different mechanism. Initially, the condensed resins employed as a suspending medium in the present invention contain no titratable acidity whatsoever. The alkaline earth metal alkyl phenate employed does not react or complex with the resin but is merely physically suspended therein. The water employed with barium alkyl phenate, for example, is not an essential reactant but is present to aid in solubilizing the phenate in the diluent oil which may be employed. Similarly, alkyl phenol is recovered when, in accordance with the invention, the acidic gas is introduced to produce colloidal inorganic alkaline earth metal salt in physical suspension in the condensed resin.

It was attempted to produce an additive by substituting the nonacidic condensed resin of the present invention for the acidic organic compound of the above-described prior art process. Inoperable gels were obtained which could not be filtered and which would not disperse in oil as compared with the readily filtrable, readily dispersible microgels of the invention.

The following examples are presented for purposes of more specific illustration of the compositions and processes of the invention. It is not intended that the scope of the invention be limited by the specific embodiments described.

A.—PREPARATION OF SULFUR-CONDENSED MICROGEL

Example I.—Separation from cylinder stock of viscous hydrocarbons for use in the preparation of dispersing mediums About 75,000 grams of a cylinder stock derived by distillation from paraffin-base Pennsylvania crude oil and characterized by a boiling point in excess of about 850° F., a molecular weight of about 750, a viscosity at 210° F. of 225 SUS, an A.P.I. gravity of about 24.8, and a flash point (Cleveland Open Cup) of about 600° F., were mixed with propane, heated to a temperature of about 190° F. and then cooled to a temperature of about 65° F. The cylinder stock-propane solution thereafter was transferred into a chilling tank wherein the pressure was reduced to an extent requisite to volatilize sufficient propane to lower the temperature of the solution from about −20° F. to about −50° F. Makeup propane was added during the chilling operation, such that the ratio of propane to cylinder stock was about 3 to 1 at the end of the chilling cycle. During the chilling cycle, petrolatum was precipitated from the solution. The chilled cylinder stock-propane solution containing precipitated petrolatum was transferred to a filter feed tank and thence passed through an appropriate filter to effect removal of the petrolatum from the chilled solution.

Propane was added to the filtrate in an amount sufficient to raise the propane-cylinder stock ratio to about 10 to 1 and the temperature of the solution so obtained was elevated to about 150° F. to 180° F. whereupon about 15,000 grams of high molecular weight viscous materials were precipitated. The viscous materials still contained some propane.

The material so obtained was mixed at a temperature of about 130° F. to 135° F. with additional propane to increase the propane-oil ratio to about 20 to 1. The temperature of the resulting solution was lowered to about 100° F. whereupon about 6,000 grams of viscous hydrocarbons were precipitated. These materials, after removal of all residual propane, are designated as heavy resins and are characterized by a molecular weight of about 1400, a viscosity of about 4100 SUS at 210° F., and a bromine number of 3.7.

The remaining oil-propane solution was heated to about 150° F. whereupon 9,000 grams of additional viscous hydrocarbons which are designated as light resins, were precipitated. Any residual propane was removed in a flash chamber. These hydrocarbons are characterized by a molecular weight of about 1300, a viscosity of about 1150 SUS at 210° F., and a bromine number of about 4.0.

Sulfur condensation

About 9,000 grams of the viscous materials separated from the cylinder stock, in the manner above described and designated as light resin, and 1000 grams of bright stock were charged to suitable apparatus and initially heated to a temperature of 500° F. Sulfur was introduced into the mixture in increments totaling about 1% of the weight of the mixture as the temperature was raised. The sulfur addition was continued for approximately 8 hours until a total amount of sulfur equal to about 22% by weight of the mixture was added, during which time the reaction mixture was maintained at a temperature of approximately 500° F. to produce a final product characterized by a ring and ball softening point of about 145° F. The final product was contacted with air to remove undesirable reactive sulfur compounds therefrom and to produce a material noncorrosive to a copper strip when tested pursuant to ASTM Procedure D–130. The bright stock referred to was a fraction of Pennsylvania paraffin-base crude oil having a boiling point range greater than about 850° F., a viscosity of about 150 SUS at 210° F. and obtained by solvent dewaxing and deresining of cylinder stock.

Example II

A microgel was prepared in a manner identical to Example I with the exception that the condensation process was terminated when the product was characterized by a ring and ball softening point of about 200° F. The material so formed was noncorrosive to a copper strip when evaluated pursuant to ASTM Procedure D–130.

Example III

The process of Example I was repeated but in this instance the condensation process was stopped at a point requisite to produce a microgel having a ring and ball softening point of about 286° F. The material so formed was noncorrosive to a copper strip when evaluated pursuant to ASTM Procedure D–130.

Example IV

A sulfur-condensed microgel was prepared from a fraction of Pennsylvania paraffin-base crude oil designated as heavy resin described in Example I, which had been further processed by solvent extracting with phenol to a 65% raffinate yield.

The material above described was characterized by an average molecular weight of about 1680, a viscosity of about 1550 SUS at 210° F., a bromine number 1.2, and was substantially wax- and asphalt-free. This material was heated to a temperature of about 475° F. and condensed with about 21% by weight of sulfur while the reaction mixture was maintained within a temperature range of 450–500° F. for a time requisite to produce a product having a ring and ball softening point of about 154° F. The final product was blown with air to render it noncorrosive to a copper strip when tested in accordance with ASTM Procedure D–130.

Example V

Example IV was repeated with the exception that the condensation reaction was continued to produce a product having a ring and ball softening point of about 250° F. The composition so obtained was noncorrosive to a copper strip when tested in accordance with ASTM Procedure D–130.

Example VI

Example IV was repeated with the exception that the condensation reaction was continued to produce a product having a ring and ball softening point of about 270° F. The composition so obtained was noncorrosive to a copper strip when tested in accordance with ASTM Procedure D–130.

Example VII

Sulfur-condensed microgels were prepared with the variations of starting materials and ring and ball soften-

TABLE 1

| Sulfur condensed materials | Percent sulfur treat. | Percent sulfur in prod. | R&B soft pt., °F. | SUS vis. at 210 | Ebull. M. wt. | V.I. of 10% blend in 60/100 |
|---|---|---|---|---|---|---|
| Heavy resin [1] | 0 | 0.26 |  | 4,100 | 1,400 | 115.7 |
|  | 12 | 2.91 | 110 |  | 1,495 | 130.9 |
|  | 21.75 | 4.20 | 253 |  |  | 148.8 |
| Light resin [2] | 0 | 0.17 |  | 1,210 | 1,110 | 115.8 |
|  | 13.5 | 2.94 |  | 4,600 | 1,250 | 125.5 |
|  | 24.6 | 4.74 | 246 |  |  | 156.3 |
| Solvent refined paraffin base bright stock.[3] | 0 | 0.14 |  | 140 | 683 | 105.2 |
|  | 26.0 | 5.10 |  | 4,340 | 917 | 116.0 |
|  | 31.0 | 7.7 | 260 |  |  | 145.0 |
| Solvent extracted mixed base bright stock.[4] |  | 0.21 |  | 153 | 769 | 96.6 |
|  | 22 | 4.28 |  | 1,206 | 826 | 113.0 |
|  | 25.6 | 4.92 | 248 |  |  | 137.9 |
| California base bright stock [5] | 0 | 0.39 |  | 185 | 688 | 97.2 |
|  | 16 | 3.48 |  | 1,185 | 816 | 108.8 |
|  | 22 | 5.04 | 258 |  |  | 128.6 |
| High viscosity resin [6] | 0 | 0.27 |  | 20,564 | 1,480 | 124.5 |
|  | 8.06 | 1.79 | 138 |  | 2,130 | 136.4 |
|  | 16.52 | 2.75 | 245 |  |  | 148.4 |
| Naphthenic base bright stock [7] | 0 | 0.33 |  | 133 | 475 | 85.5 |
|  | 10 | 2.32 |  | 408 | 526 | 115.4 |

[1] The heavy resin derived from Pennsylvania base crude oil and described in Example I.
[2] Light resin derived from Pennsylvania base crude as described under Example I and characterized by a viscosity at 210° F. of 1210 SUS and an average molecular weight of about 1110.
[3] Solvent refined paraffin base bright stock derived by propane dewaxing of Pennsylvania crude residual cylinder stock and phenol extraction to a 92.0% raffinate yield. This stock is characterized by a viscosity at 210° F. of about 140 SUS, a viscosity index of about 102, a flash point of about 550° F. and a pour point of +15° F.
[4] Solvent extracted mixed base bright stock prepared by solvent treatment of a Mid-Continent base crude residuum and characterized by a viscosity of 152.8 SUS at 210° F., a bromine number of 2.4, and a molecular weight of about 770.
[5] California base bright stock derived by solvent refining of a California crude residuum and characterized by a viscosity at 210° F. of about 185 SUS and a V.I. of about 84.7.
[6] High viscosity resin derived from Pennsylvania base crude oil by propane precipitation from cylinder stock and characterized by a viscosity at 210° F. of about 20,565 SUS, a flash point of 660° F., a fire point of about 735° F., carbon residue of 13.95% and 0.44% naphtha insolubles.
[7] Naphthenic base bright stock, a residuum obtained from a naphthenic base crude oil and characterized by a viscosity of 133 SUS at 210° F., a flash point of 490° F., a pour point of +20° F., and a carbon residue of about 0.75%.

ing points in the final condensation products as indicated in Table I. All of the sulfur-condensed microgels so produced were noncorrosive to a copper strip when tested in accordance with ASTM Procedure D–130.

Example VIII

About 100 parts by weight of a bright stock extract, which is a fraction of Pennsylvania crude oil removed from Pennsylvania bright stock by phenol extraction, was employed as the starting material for the production of the sulfur-condensation product useful as a suspending medium in accordance with the invention. The bright stock extract employed was characterized by the following physical properties:

| | |
|---|---|
| Gravity | ° API 10.4 |
| Viscosity at 100° F. | SUS 840,000 |
| Viscosity at 210° F. | SUS 1210 |
| Viscosity index | −173 |

The bright stock extract was condensed with sulfur under the conditions corresponding to those described in Example I to produce a final product having a ring and ball softening point of about 248° F. and containing about 3.4% of combined sulfur. The condensation product was contacted with air to render it noncorrosive to a copper strip when tested in accordance with ASTM Procedure D–130.

Example IX

A light resin raffinate obtained by phenol extraction of the light resins described in Example I to an 85% raffinate and characterized by an ebullioscopic weight of about 1350 and a viscosity at 210° F. of about 916 SUS was sulfur-condensed in a manner similar to that described in Example I to a ring and ball softening point of about 188° F. The sulfur-condensed raffinate was reacted at a temperature of about 400° F. for a period of about one hour with about ½% of a mixture of polyalkylene polyamines which was predominantly diethylene triamine and triethylene tetramine. The ring and ball softening point of the reaction product was 220° F.

Example X

Example IX was repeated with the exception that the light resin raffinate sulfur-condensed microgel had a ring and ball softening point of about 216° F. Such product was treated with about 2% by weight of diphenylamine under the same conditions and in the same manner as described in Example IX.

Example XI

A light resin raffinate sulfur-condensed microgel of the type described in Example IX but having a ring and ball softening point of about 249° F. was reacted with ammonia gas for a period of about one hour at a temperature of 500° F. Gaseous ammonia was passed through the reaction mixture at the rate of about 8 liters per hours. The reaction product has a ring and ball softening point of about 260° F. and contained 0.8% chemically combined nitrogen.

Example XII

Approximately 5000 grams of the light resin described in Example I was heated to about 425° F. Elemental sulfur was added in 1% by weight increments every fifteen minutes for a total of about 23.5% sulfur. Nitrogen gas was passed through the reacting mixture continuously at the rate of about 1 liter per minute. The final product was characterized by a ring and ball softening point of about 182° F. A blend of about 10% by weight of this product in the same medium neutral raffinate exhibited no tarnish or corrosion when evaluated by the ASTM Copper Strip Corrosion Test D–130.

B.—INCORPORATION OF OIL-INSOLUBLE MATERIAL INTO SULFUR-CONDENSED HYDROCARBONS

Example XIII

Approximately 100 parts by weight of a sulfur-condensed light resin raffinate having a ring and ball softening point of about 250° F. was blended with 400 parts by weight of a medium neutral raffinate. This blend was heated to a temperature of 400° F. There then was added in four equal increments at intervals of about twenty minutes approximately 120 parts by weight of barium nonyl phenate and 60 parts by weight of the same medium neutral raffinate. After each addition the mixture was stirred for ten minutes and then contacted with carbon dioxide and steam for a period of ten minutes. After the final increment, the carbon dioxide and steam sparge was maintained for a period of about forty-five minutes. The exhaust gases carrying freed nonyl phenol was passed through a condenser and finally through a benzene scrubber.

After the resulting product was centrifuged and filtered, it was found to contain 3.72% barium and was characterized by a base number (ASTM D 664–52) of 4.9.

This product was diluted with the same medium neutral raffinate until a stable dispersion containing 10% of the product was obtained. The viscosity of the final product was 623.8 SUS at 100° F. and 83.9 SUS at 210° F., while the viscosity index was 125.6.

Example XIV

Approximately 100 parts by weight of sulfur-condensed light resin raffinate having a ring and ball softening point of 101° F. was blended with approximately 400 parts by weight of a medium neutral raffinate and the blend was heated to a temperature of 400° F. To the blend so formed, barium nonyl phenate was added in amounts requisite to provide the barium-sulfur-condensed raffinate weight ratios indicated in Table 2. (The weight ratio is the theoretical weight of barium compared to the weight of the sulfur-condensed light resin raffinate.) The barium nonyl phenate was added to the sulfur-condensed light resin raffinate in four increments. Following each increment, the mixture was stirred for ten minutes and carbon dioxide and steam were passed through the mixture for an additional ten minutes. Following the final increment of the barium nonyl phenate, carbon dioxide and steam were passed through the reaction mixture until nonyl phenate no longer distilled overhead. The total reaction time varied between eight and sixteen hours. The results obtained are shown in Table 2.

TABLE 2

| | A | B | C |
|---|---|---|---|
| Barium/resin, weight ratio | 1:1 | 1.5:1 | 2:1 |
| Percent sulfur-condensed hydrocarbons | 10.5 | 9.6 | 7.8 |
| Theoretical, percent barium | 10.5 | 14.4 | 15.6 |
| Reaction product: | | | |
| Vis. at 210 SUS | 87.1 | 114.8 | 190.3 |
| Vis. at 100 SUS | 867.3 | 1,466.0 | 5,512.6 |
| V.I. | 105.9 | 102.0 | 64.7 |
| Percent barium | 9.96 | 11.38 | 12.78 |
| Percent barium efficiency | 94.8 | 79.0 | 81.9 |

Example XV

Example XIV was repeated employing a sulfur-condensed light resin raffinate having a ring and ball softening point of 195° F. with the indicated results.

TABLE 3

| | A | B | C |
|---|---|---|---|
| Barium/rsin, weight ratio | 1:1 | 1.5:1 | 2:1 |
| Percent sulfur-condensed hydrocarbons | 10.2 | 8.9 | 8.0 |
| Theoretical, percent barium | 10.2 | 13.4 | 16.0 |
| Reaction product: | | | |
| Vis. at 210 SUS | 136.0 | 216.0 | 242.3 |
| Vis. at 100 SUS | 1,882.6 | 5,507.5 | 8,061.8 |
| V.I. | 103.6 | 82.8 | 68.8 |
| Percent barium | 9.90 | 13.90 | 13.85 |
| Percent barium efficiency | 97.1 | 100.0 | 86.6 |

Example XVI

Example XIV was repeated employing a sulfur-condensed light resin raffinate having a ring and ball softening point of 223° F. with the indicated results.

TABLE 4

|  | A | B | C |
| --- | --- | --- | --- |
| Barium/resin, weight ratio | 1:1 | 1.5:1 | 2:1 |
| Percent sulfur-condensed hydrocarbons | 9.5 | 9.4 | 7.7 |
| Theoretical, percent barium | 9.5 | 14.2 | 15.4 |
| Reaction product: |  |  |  |
| Vis. at 210 SUS | 121.4 | 340.0 | 238.9 |
| Vis. at 100 SUS | 1,595.4 | 5,525.6 | 7,158.0 |
| V.I. | 102.5 | 115.1 | 76.1 |
| Percent barium | 9.30 | 14.68 | 12.18 |
| Percent barium efficiency | 97.9 | 100.0 | 79.1 |

Example XVII

Example XIV was repeated employing a sulfur-condensed light resin raffinate having a ring and ball softening point of 262° F. with the indicated results.

TABLE 5

|  | A | B | C |
| --- | --- | --- | --- |
| Barium/resin, weight ratio | 1:1 | 1.5:1 | 2:1 |
| Percent sulfur-condensed hydrocarbons | 10.4 | 9.6 | 7.8 |
| Theoretical, percent barium | 10.4 | 14.4 | 15.6 |
| Reaction product: |  |  |  |
| Vis. at 210 SUS | 194.4 | 276.0 | 278.5 |
| Vis. at 100 SUS | 3,080.6 | 7,567.0 | 9,142.2 |
| V.I. | 106.8 | 88.7 | 77.6 |
| Percent barium | 10.68 | 13.2 | 12.51 |
| Percent barium efficiency | 100.0 | 91.7 | 80.2 |

Example XVIII

The sulfur-condensed hydrocarbons containing barium of Tables 2, 3, 4 and 5 were blended with medium neutral raffinate to produce blends containing 5% of sulfur-condensed hydrocarbons. In each instance the blend remained stable and showed no sediment after more than one year.

Example XIX

Approximately 35 parts by weight of barium hydroxide octahydrate and 47.8 parts of nonyl phenol were blended with 100 parts by weight of medium neutral raffinate. The stoichiometric mixture was stirred at 180° F. until it became a slurry that could be handled easily.

In a separate vessel, approximately 400 parts of a 20% concentrate of sulfurized light resin raffinate (190° F. ring and ball softening point) in medium neutral raffinate was heated to 400° F. The barium phenate slurried in a medium neutral raffinate was added to the sulfurized hydrocarbon in six increments. The reaction mixture was stirred for thirty minutes and then carbon dioxide and superheated steam were sparged into the mixture for thirty minutes. This procedure was repeated until all six increments had been added. Upon completion of the reaction, the barium treated oil was filtered through a filter paper and the barium concentration was determined by the sulfated ash method (ASTM B 874–51). The barium concentration was found to be 1.93% or 77% of the barium present in the reaction mixture.

Example XX

Stoichiometric proportions of barium sulfide (16.9 parts) and nonyl phenol (43.0 parts) were mixed with 60.0 parts of water and the mixture was heated to 180° F. After three hours, the temperature was increased to drive off the water. The resulting phenate, a thick slurry, was blended with 100 parts of medium neutral raffinate and was added to a sulfurized light resin raffinate in the manner described in Example XIX. The barium concentration was found to be 1.33% or 53% of the total barium present in the reaction mixture.

Example XXI

Barium nonyl phenate prepared in the manner described in Example XX was blended with a sulfurized light resin raffinate in the manner described in Example XIX except that the blending reaction was conducted at 285° F. The filtered oil contained 1.49% barium or 50.0% of the barium present in the reaction mixture.

Example XXII

Stoichiometric proportions of barium hydroxide (35.0 parts) and p-tert-butyl phenol (33.3 parts) were mixed with 100 grams of medium neutral raffinate at 180° F. The reaction formed a very thick slurry which was blended with an additional 100 grams of medium neutral raffinate. The barium p-tert-butyl phenate thus formed was added to a sulfurized light resin raffinate (190° F. ring and ball softening point) in the manner described in Example XIX. The filtered oil product contained 1.52% barium or 69% of the barium present in the reaction mixture.

Example XXIII

Stoichiometric proportions of barium hydroxide octahydrate (35.0 parts) and ortho-cresol (21.8 parts) were blended together. The barium hydroxide was dispersed in the ortho-cresol and remained dispersed on standing. The material so prepared was employed in the process described in Example XIX. The filtered oil product contained 0.326% barium or 10.9% of the barium present in the reaction mixture.

Example XXIV

Approximately 28.8 parts by weight of caprylic acid were added to 50.0 parts of medium neutral raffinate and 35 parts of barium hydroxide octahydrate were slowly stirred into this mixture. The extremely viscous caprylate was blended with an additional 50.0 parts of medium neutral raffinate and was employed in the process described in Example XIX. The filtered oil product contained 0.292% barium or 12.2% of the barium present in the reaction mixture.

Example XXV

Approximately 28.8 parts of caprylic acid were blended with 25.0 parts of medium neutral raffinate and 21.6 parts of barium sulfide were slowly added to the mixture. After three hours, the solution became quite viscous and was blended with an additional 25.0 parts of medium neutral raffinate. The caprylate was employed as described in Example XIX and yielded a filtered oil product with a 0.42% barium concentration or 14.0% of the barium present in the reaction mixture.

Example XXVI

Approximately 35.2 parts of butyric acid were blended with 50.0 parts of medium neutral raffinate and to this mixture 21.5 parts of barium carbonate were slowly added with constant stirring. The viscous reaction product was blended with an additional 67.5 parts of medium neutral raffinate and was employed in the process described in Example XIX. The filtered oil product contained 0.324% barium or 10.7% of the barium present in the reaction mixture.

Example XXVII

Approximately 216 parts by weight of barium carbonate were incorporated into 50 parts of medium neutral raffinate to form a very fine dispersion. Upon adding an excess of acetic acid, a thick slurry was formed which was blended with an additional 50 parts of medium neutral raffinate. The solution of barium acetate so formed was employed in the process described in Example XIX. The filtered oil product contained 0.33% barium or 11% of the barium present in the reaction mixture.

Example XXVIII

Approximately 2 molar parts of hexanoyl acetone and 1 molar part of barium hydroxide octahydrate were admixed with 200 parts by weight of methyl alcohol. After stirring for one hour, the product was washed with methyl alcohol and suction filtered. The barium hexanoyl acetonate was dissolved in 10 parts of medium neutral raffinate and employed in the process of Example XIX. The filtrated oil product contained 1.33% barium or 36% to the total barium present in the reaction mixture.

Example XXIX

Example XIX was repeated except that boric acid and steam were employed as the acidic gas. The filtered oil product contained 1.75% barium or 58.3% of the total barium present in the reaction mixture.

Example XXX

In order to demonstrate the wide range of sulfur-condensation products which may be employed in this invention, a light resin raffinate having a viscosity of about 850 SUS at 210° F. was sulfur-condensed to yield products having viscosities ranging from 1,084 SUS at 210° F. to ring and ball softening points of 262° F. The sulfur-condensed products were blended with four times their weight of medium neutral raffinate and were employed in the process described in Example XIX. In each case, the barium/sulfur-condensed hydrocarbon weight ratio was approximately 1.0. The results are tabulated in Table 6.

TABLE 6

| | | | | | | | |
|---|---|---|---|---|---|---|---|
| (a) Condensation Reaction: | | | | | | | |
| Viscosity, SUS at 210° F. | 1,084 | 1,804 | 14,600 | | | | |
| Ring and ball softening point, °F. | | | 83 | 101 | 195 | 223 | 262 |
| Percent sulfur required | 5.0 | 10.0 | 19.0 | 24.0 | 26.5 | 27.25 | 27.0 |
| (b) Dispersion Reaction: | | | | | | | |
| Percent sulfur-condensed hydrocarbons | 10.3 | 9.5 | 9.6 | 10.5 | 10.2 | 9.5 | 10.4 |
| Theoretical, percent barium | 10.3 | 9.5 | 9.6 | 10.5 | 10.2 | 9.5 | 10.4 |
| (c) Reaction product: | | | | | | | |
| Vis. at 210° F., SUS | 72.5 | 81.8 | 100.2 | 87.1 | 136.0 | 121.4 | 194.4 |
| Vis. at 100° F., SUS | 661.5 | 860.2 | 1,364.0 | 867.3 | 1,882.6 | 1,595.4 | 3,080.6 |
| V. I. | 98.4 | 96.0 | 83.3 | 105.9 | 103.6 | 102.5 | 106.8 |
| Percent barium | 9.64 | 9.75 | 9.01 | 9.96 | 9.90 | 9.30 | 10.68 |
| Percent barium efficiency | 93.7 | 100 | 93.9 | 94.8 | 97.1 | 97.9 | 100 |

Example XXXI

Four hundred thirty grams of nonyl phenol, 74.1 grams of calcium hydroxide and 504.1 grams of ethylene glycol were refluxed at a temperature of 310° F. for eight hours. There were then added 468.1 grams of medium neutral raffinate. Following removal of the ethylene glycol by distillation under vacuum, a 50% concentrate of calcium nonyl phenate in oil was obtained. The mixture contained 3.34% calcium.

In a separate vessel, approximately 400 grams of a 20% concentrate of sulfurized light resin raffinate (190° F. ring and ball softening point) in medium neutral raffinate was heated to 40° F. The calcium nonyl phenate concentrate obtained above was added to the sulfurized hydrocarbon in four increments. The reaction mixture was stirred for 30 minutes and carbon dioxide and superheated steam were sparged into the mixture for ten minutes. The carbon dioxide addition rate was 0.5 liter/minute, while the steam was admitted at the rate of about 5.0 liters per minute. This procedure was repeated until all four increments had been added. The carbon dioxide-steam blowing was then continued for a period of about five hours. Upon completion of the reaction, the calcium-treated oil was filtered through a filter paper, and the calcium concentration determined by the sulfated ash method (ASTM B 874–51). The calcium concentration was found to be 3.03% as opposed to a theoretical concentration of 4.73%. The additive thus prepared was completely compatible with hydrocarbon oils.

Example XXXII

The light resin raffinate described in Example IX was sulfur condensed at 500° F. with 21% by weight elemental sulfur to yield a ring and ball softening point of about 90° F. At this point phosphorous pentasulfide was added in small increments until a total of about 3% by weight was introduced into the reaction mixture. The resulting ring and ball softening point was 115° F. The condensation reaction was completed by the addition of 4% by weight elemental sulfur in small increments to reach a final ring and ball softening point of about 181° F. The condensed hydrocarbon was blown with air for a short period of time to render it non-corrosive to a copper strip according to ASTM procedure D–130. The product contained no free acidity as determined by conventional neutralization number procedures.

Approximately 100 parts by weight of this condensed hydrocarbon was blended with 400 parts by weight of medium neutral raffinate. To this blend was then added in four equal increments approximately 400 parts by weight of barium nonyl phenate and 250 parts by weight of the same medium neutral raffinate. After each addition the reaction mixture was stirred and then contacted with carbon dioxide and steam for a period of about ten minutes. After the final increment the carbon dioxide and steam addition was maintained until nonyl phenol recovery was essentially completed. The exhaust gases carrying freed nonyl phenol were passed through a condenser and a benzene scrubber.

After the resulting product was filtered, it was found to contain about 10.5% barium as compared with a theoretical value of 10.2%. A blend consisting of an equal part each of this product and medium neutral raffinate was stable over a period of more than one year, exhibiting no tendency for dispersed barium carbonate to settle out.

Since modifications of the invention will be apparent to those skilled in the art, the invention is intended to be limited only by the scope of the appended claims.

We claim:

1. A composition of matter for incorporation in oleaginous compositions consisting essentially of a normally insoluble alkaline earth metal salt in a substantially non-acidic oil-compatible sulfur condensed hydrocarbon suspending medium produced by contacting a hydrocarbon starting material having an ebullioscopic molecular weight in excess of about 500 while at a temperature of at least 400° F. with at least about 5% by weight of elemental sulfur, said sulfur condensed hydrocarbon being effective in a concentration of about 10% by weight to increase the viscosity index of a 60 at 100 SUS standard base oil derived from a paraffinic crude source at least ten viscosity index units more than does a like amount of the hydrocarbon starting material from which said condensation product is produced, and thereafter blending an alkaline earth organic salt with the sulfur condensed hydrocarbon, contacting the mixture with an acidic gas and removing the acidic organic constituent, leaving a stably dispersed alkaline earth metal salt in said resin.

2. A composition as claimed in claim 1 wherein the alkaline earth metal is barium.

3. A composition as claimed in claim 1 wherein the alkaline earth metal is calcium.

4. A composition as claimed in claim 1 wherein the acidic gas is a member selected from the group consisting of $HNO_3$, $HCl$, $SO_2$, $SO_3$, $H_2S$, $CO_2$, $ClO_2$, and $H_3BO_3$.

5. A composition as claimed in claim 1 wherein the alkaline earth metal salt is an organic salt selected from the group consisting of phenols, cresols, alkylated hydroxy aromatic carboxylic acid salts, alkylated polyhydroxyaromatic compounds, aliphatic carbonylic acid salts, and organic chelating agents.

6. The method of stably dispersing an alkaline earth metal salt in a substantially non-acidic oil-compatible sulfur condensed hydrocarbon suspending medium produced by contacting a hydrocarbon starting material having an ebullioscopic molecular weight in excess of about 500 while at a temperature of at least 400° F. with at least about 5% by weight of elemental sulfur, said sulfur condensed hydrocarbon being effective in a concentration of about 10% by weight to increase the viscosity index of a 60 at 100 SUS standard base oil derived from a paraffinic crude source at least ten viscosity index units more than does a like amount of the hydrocarbon starting material from which said condensation product is produced, which comprises blending an oil-compatible alkaline earth organic salt with the sulfur condensed hydrocarbon, contacting the mixture in the presence of a hydration agent with an acidic gas, removing the acidic organic constituent, leaving a stably dispersed alkaline earth metal salt in said resin.

7. The method of claim 6 wherein the salt-sulfur-condensed hydrocarbon mixture is contacted with the acidic gas while at a temperature of from about 250° to about 500° F.

8. The method of claim 6 wherein the alkaline earth organic salt is an alkaline earth alkyl phenate.

9. The method of claim 6 wherein the alkaline earth organic salt is a barium alkyl phenate and the acidic gas is $CO_2$ injected concurrently with steam.

10. The method of claim 6 wherein the alkaline earth organic salt is calcium alkyl phenate and the acidic gas is $CO_2$ injected concurrently with steam.

References Cited

UNITED STATES PATENTS

| | | | |
|---|---|---|---|
| 2,406,041 | 8/1946 | Schneider et al. | 252—461.4 |
| 2,485,861 | 10/1949 | Campbell et al. | 252—18 |
| 2,614,985 | 10/1952 | Cook | 252—25 |
| 2,732,346 | 1/1956 | Jones et al. | 252—45 |
| 2,822,332 | 2/1958 | Logan | 252—45 |

OTHER REFERENCES

George: Motor Oils and Engine Lubrication, Reinhold Publication Corp., New York, 1950, p. 170.

DANIEL E. WYMAN, Primary Examiner

I. VAUGHN, Assistant Examiner

U.S. Cl. X.R.

252—45